(12) United States Patent
Yao

(10) Patent No.: US 7,099,571 B2
(45) Date of Patent: Aug. 29, 2006

(54) STEAM-SUPPLYING APPARATUS FOR HAIRDRESSING AND BEAUTY CARE

(75) Inventor: Isoji Yao, Higashiosaka (JP)

(73) Assignee: Naomoto Industry Co., Ltd., Osaka (JP)

( * ) Notice: Subject to any disclaimer, the term of this patent is extended or adjusted under 35 U.S.C. 154(b) by 0 days.

(21) Appl. No.: 10/627,759

(22) Filed: Jul. 28, 2003

(65) Prior Publication Data

US 2005/0276585 A1    Dec. 15, 2005

(30) Foreign Application Priority Data

Jul. 30, 2002    (JP)    ............................. 2002-221973

(51) Int. Cl.
*A61H 33/12*    (2006.01)
(52) U.S. Cl. ...................... 392/405; 392/400
(58) Field of Classification Search ................ 392/386, 392/394, 397, 398, 400, 401, 402, 403, 404, 392/405, 406; 261/139, 142, 34.1, 38, DIG. 65
See application file for complete search history.

(56) References Cited

U.S. PATENT DOCUMENTS

| | | | | |
|---|---|---|---|---|
| 2,437,963 A | * | 3/1948 | Langmuir et al. | ............. 516/8 |
| 5,076,467 A | * | 12/1991 | Sugo | .............................. 222/3 |
| 5,186,120 A | * | 2/1993 | Ohnishi et al. | ............. 118/667 |
| 5,803,938 A | * | 9/1998 | Yamaguchi et al. | ........ 261/130 |
| 6,072,937 A | * | 6/2000 | Benade et al. | .............. 392/336 |
| 6,647,204 B1 | * | 11/2003 | Hutchinson | ................. 392/491 |

* cited by examiner

*Primary Examiner*—Sang Y. Paik
(74) *Attorney, Agent, or Firm*—Armstrong, Kratz, Quintos, Hanson & Brooks, LLP.

(57) ABSTRACT

A steam-supplying apparatus for hairdressing and beauty care in which pressurized steam is sent from a steam-generating portion through an electromagnetic valve and a connecting tube, and forced to jet out of a steam-blowing portion. The electromagnetic valve has a heating steam circulation passage to preliminary heat inside the electromagnetic valve by the steam from the steam-generating portion also in closed state, and the steam-blowing portion has an electric heater to heat a steam passage in the blowing portion.

2 Claims, 7 Drawing Sheets

STEAM-SUPPLYING APPARATUS FOR HAIRDRESSING AND BEAUTY CARE

BACKGROUND OF THE INVENTION

1. Field of the Invention

This invention relates to a steam-supplying apparatus for hairdressing and beauty care.

2. Description of the Related Art

Generally, to conduct permanent wave or hair dye, hair is heated by far infrared radiation after treatment with chemicals, or naturally dried to finish. And, to conduct facial beauty care, a face is treated with steam or left for about 20 minutes after entirely smeared with face lotion.

And, a conventional steam-supplying apparatus for hairdressing and beauty care is constructed as to boil water under atmospheric pressure to generate vapor (steam without pressure) applied to hair or the face.

However, in the conventional steam-supplying apparatus for hairdressing and beauty care, the vapor (in natural rising state) only partially contacts the face, and uniform finish of the entire face is difficult. Further, it is difficult to utilize the vapor because near an outlet of the vapor is too hot to come close, and the vapor does not reach for the face when the outlet is distant from the face. And, the hair is damaged because the time that the hair is exposed to the chemicals and heat is long.

It is therefore an object of the present invention to provide a steam-supplying apparatus for hairdressing and beauty care with which finishing time of hairdressing and beauty care is greatly shortened, damage to the hair and skin of the face and body is reduced as much as possible, and blowing of high-temperature water drops is restricted to prevent burn on the skin.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
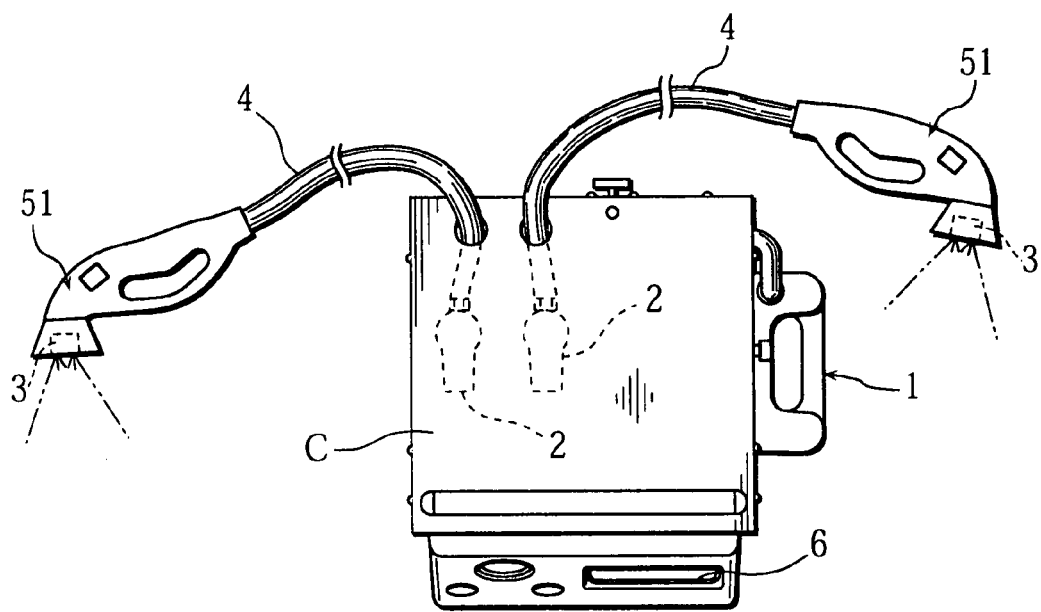
FIG. 1 is a top view showing an embodiment of the present invention.
Figure 2:
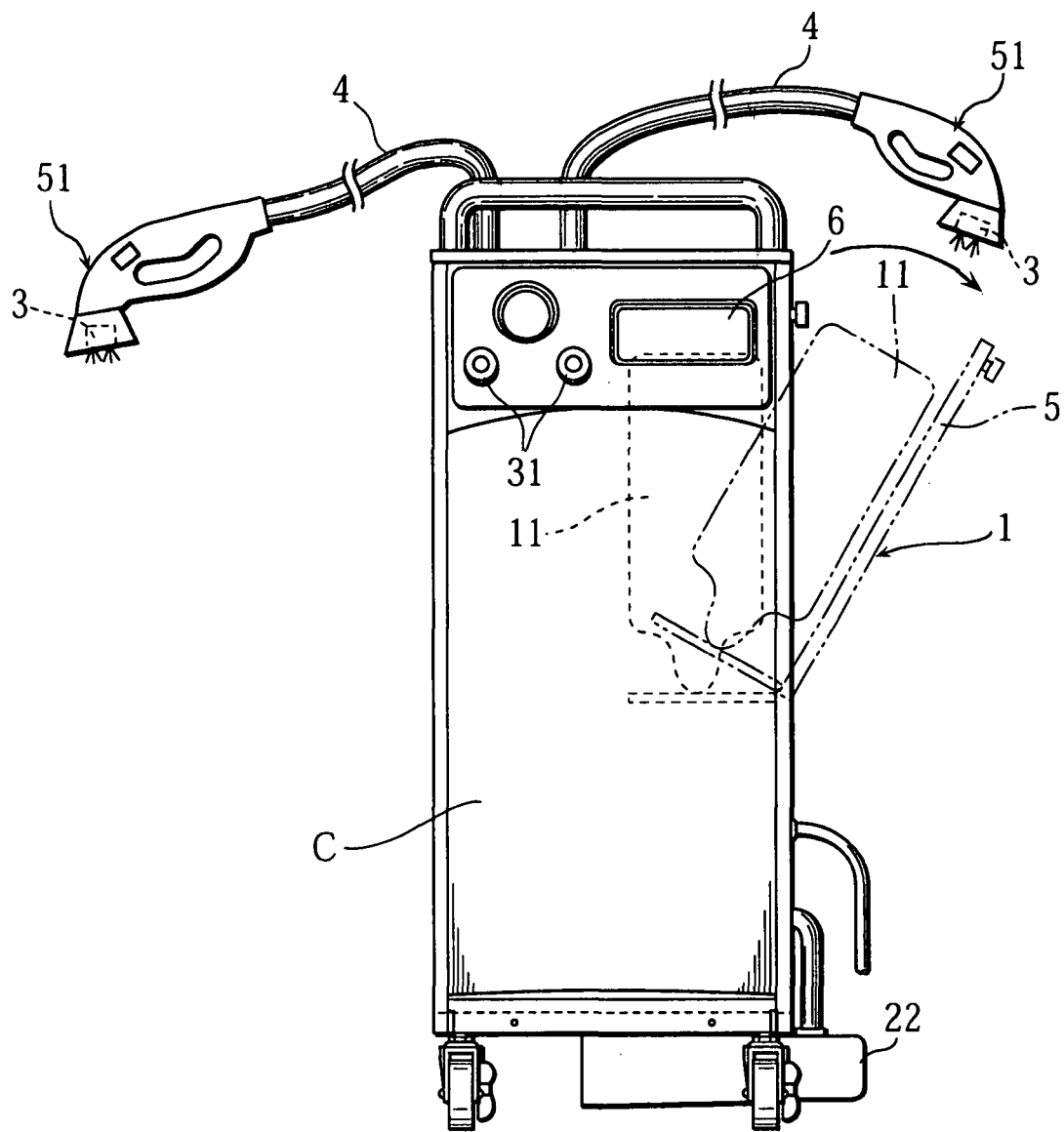
FIG. 2 is a front view.
Figure 3:
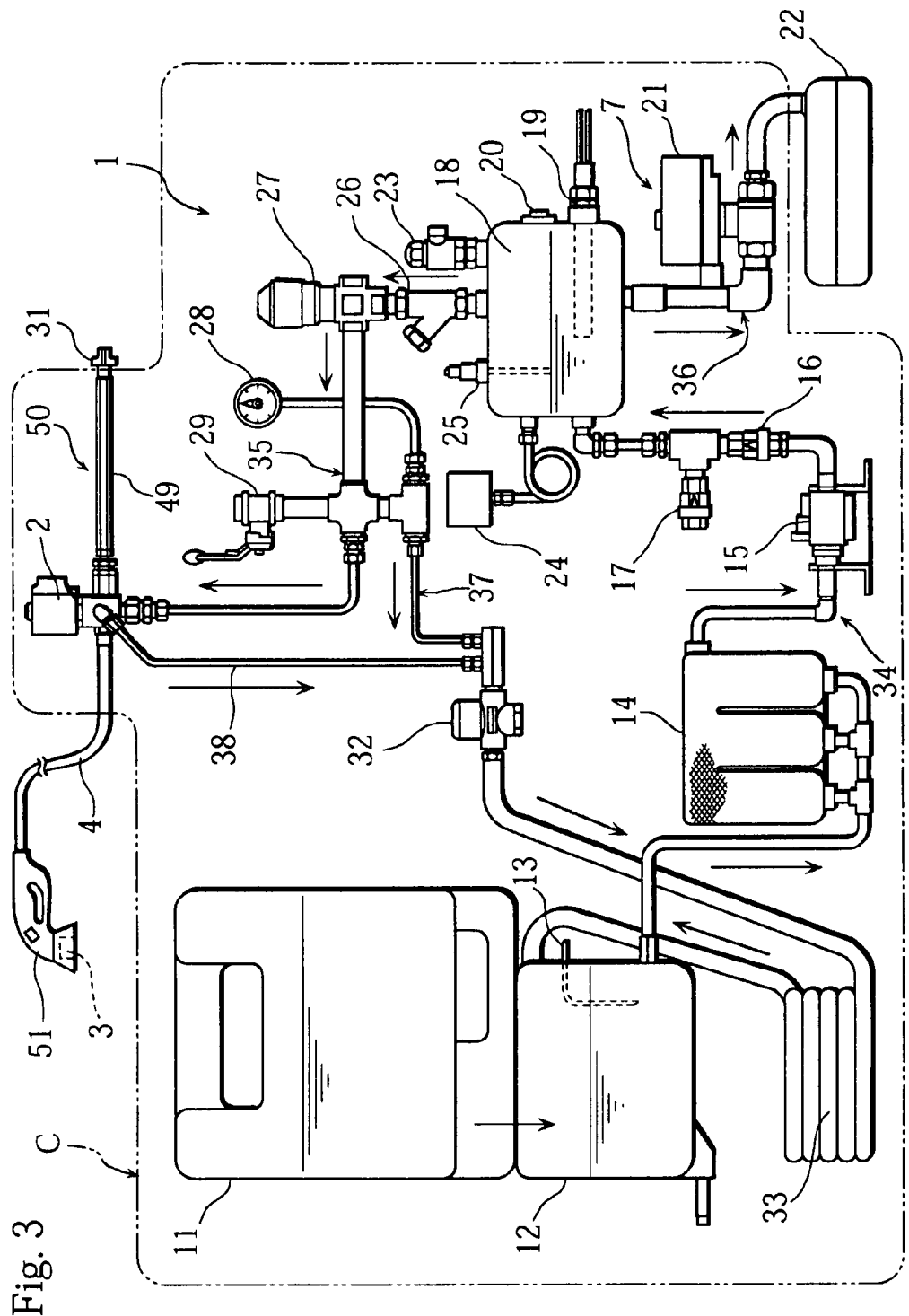
FIG. 3 is a simplified explanatory view of construction of a steam-generating portion.

FIG. 1, FIG. 2, and FIG. 3 show an embodiment of a steam-supplying apparatus for hairdressing and beauty care relating to the present invention. This apparatus is constructed as that pressurized steam is sent from a steam-generating portion 1 (mostly) included in a casing C through an electromagnetic valve 2 and a flexible connecting tube 4 (such as a hose), and forced to jet out of a steam-blowing portion 3 of a steam blower 51. The "pressurized steam" means steam having pressure which is higher than atmospheric pressure.

The apparatus is used to forcibly blow steam toward hair, a face, or a body (smeared with chemicals, cosmetics, beauty lotion, etc.) when the hair is permanent-waved or dyed, and beauty care of the face or the (entire) body is conducted.

The steam-generating portion 1, as shown in FIG. 3, has a boiler (a can for boiling water) 18 and a changeable cartridge water tank 11 for supplying water to the boiler 18. The boiler 18 is connected to the cartridge water tank 11 through a water passage 34 and connected to the electromagnetic valve 2 through a steam passage 35.

The cartridge water tank 11 is placed on an upper face of a built-in water tank 12 connected to the water passage 34 on its upstream side, and the water in the cartridge water tank 11 falls into the built-in water tank 12 through a valve (not shown in Figures). The cartridge water tank 11, set within the casing C as to be freely taken out of the casing C through a door 5 as shown in FIG. 2, can easily supply clean water to the apparatus.

On the water passage 34, a cartridge ion exchange resin 14, a water-supplying pump 15, and a water-supplying check valve 16 are serially disposed from the upstream side toward a downstream side. When the apparatus is used for a long time and much amount of steam is used, although impurity is condensed in the water in the boiler 18 and carryover is generated and water drops are made, the impurity is reduced by the cartridge ion exchange resin 14. And, the cartridge ion exchange resin 14 is exchangeable and easily replaced with another cartridge. And, life of the cartridge ion exchange resin 14 may be indicated on an operation panel 6 disposed on a front face of the casing C. In this case, operation time of the water-supplying pump 15 is accumulated by a timer (not shown in Figures) to set the life of the cartridge ion exchange resin 14 by estimation of used water amount, and the timer is reset when the cartridge ion exchange resin 14 is changed for another cartridge.

The boiler 18 is provided with an electric heater 19 inserted to a liquid phase (water) side and a pressure-setting switch 24 communicatively connected to a gas phase (steam) side. The electric heater 19 boils the water in the boiler 18 to generate steam, and the pressure-setting switch 24 switches on and off the electric heater 19 comparing steam pressure in the boiler 18 with (preliminarily) set pressure. That is to say, electricity to the electric heater 19 is stopped when the pressure in the boiler reaches for the set pressure, and the electricity is sent to the electric heater 19 again when the pressure in the boiler becomes less than the set pressure. Therefore, the pressure in the boiler 18 can be kept stable.

And, a pressure safety valve 23 is attached to the gas phase side of the boiler 18 to prevent the boiler 18 from having abnormally high pressure by jetting the steam out of the pressure safety valve 23 when some abnormalities are generated and the pressure rises over the set pressure.

And, an electrode 25 for water-level detection to detect the water level is inserted to the boiler 18 for stopping the electricity of the electric heater 19 when the water level continues to be low over a certain duration of time. Therefore, dry heating of the boiler by the electric heater 19 is prevented.

On the steam passage 35, a strainer 26 and a pressure-reducing valve 27 are serially disposed from the upstream side toward a downstream side. The pressure-reducing valve 27 is composed as to make the steam pressure high (0.5 MPa, for example) on the upstream side in the boiler 18, and low (0.2 MPa, for example) on the downstream side in the boiler 18 to jet the steam stably from the steam-blowing portion 3 until the pressure in the boiler 18 becomes low (0.2 MPa, for example). That is to say, although the steam pressure may be lowered and amount of the jetted steam may be reduced in operation, and the steam amount may vary from the beginning to the end of the operation, the amount of the jetted steam can be stabilized by the pressure-reducing valve 27 in this apparatus.

And, the steam-generating portion 1 is provided with an automatic drain means 7 to drain the water in the boiler 18 when the temperature of the boiler 18 is less than a predetermined value. To describe concretely, the boiler 18 is connected to a drain-receiving tank 22 placed outside of the casing C through a drain passage 36, and an electric valve 21 is disposed on the drain passage 36. And, a temperature sensor 20 attached on the surface of the boiler 18 detects the temperature of the surface of the boiler 18 being naturally cooled after a main power source is cut off after the operation, the main power source is switched on again when the temperature becomes lower than a predetermined value of low temperature (50° C., for example) to open the electric valve 21 to drain the water in the boiler 18 toward the drain-receiving tank 22. In this case, the electromagnetic valve 2 is opened to let the air flow into the boiler 18. That is to say, the automatic drain means 7 is composed of the temperature sensor 20 on the boiler, the electric valve 21, and the electromagnetic valve 2.

Therefore, although scale is generated by condensation of impurity in the water in the boiler 18 after much steam is used for the apparatus, the scale in the boiler 18 is discharged before the apparatus is used again to prevent the carryover in the boiler 18. By setting the predetermined value to be low, the electric valve 21 and the electromagnetic valve 2 are closed when the temperature in the boiler 18 is high to prevent high-temperature and high-pressure steam and hot water from jetting.

Next, to explain the function of the steam-generating portion 1 composed as described above, the main power source of the apparatus is switched on, and the electric valve 21 and the electromagnetic valve 2 are closed after the water in the boiler 18 is discharged by the automatic drain means 7 if the surface temperature of the boiler 18 is low (less than 50° C., for example).

Then, an electrode 13 for water-level detection detects the water in the built-in water tank 12, the water-supplying pump 15 works to send the water from the built-in water tank 12 to the boiler 18 through the cartridge ion exchange resin 14 and the water-supplying check valve 16. When the water flowing into the boiler 18 contacts the electrode 25 for water-level detection of the boiler (for a certain duration of time) to stop the water-supplying pump 15. On the other hand, when the surface of the water is parted from the electrode 25 for water-level detection (for a certain duration of time), the water-supplying pump 15 works again to supply the water to the boiler 18. If the built-in water tank 12 is not holding the water, the water-supplying pump 15 is restricted by the electrode 13 for water-level detection to prevent the air from flowing into the water-supplying pump 15.

And, when the boiler 18 is holding the water of which surface is detected by the electrode 25 for water-level detection, the electric heater 19 is electrified to boil the water in the boiler 18 and generate steam. The generated steam is supplied to the electromagnetic valve 2 through the strainer 26 and the pressure-reducing valve 27.

A pressure gauge 28 is connected to the steam passage 35 to check the pressure. And, a steam vent valve 29 is connected to the steam passage 35 to discharge the steam in the boiler 18 in repairing, checkup, etc.

And, the steam passage 35 is connected to a steam trap 32 through a sub passage 37 to discharge water drops (drain) generated in the steam passage 35. The steam trap 32 is connected to the built-in water tank 12 through a drain-cooling tube 33 to cool the high-temperature drain in the steam trap 32 and return the drain to the built-in water tank 12.

Then, when the main power source of the apparatus is switched off and the boiler 18 is cooled, the steam may be liquefied and vacuum state is made in the boiler 18, and the boiler 18 may be fully filled with water sucked from the built-in water tank 12. A vacuum release valve 27 for the boiler is connected to a portion on a downstream side to the water-supplying check valve 16 of the water passage 34 to prevent the boiler 18 from being fully filled with water by suction of the air when the pressure in the boiler 18 becomes negative pressure.

Figure 4:
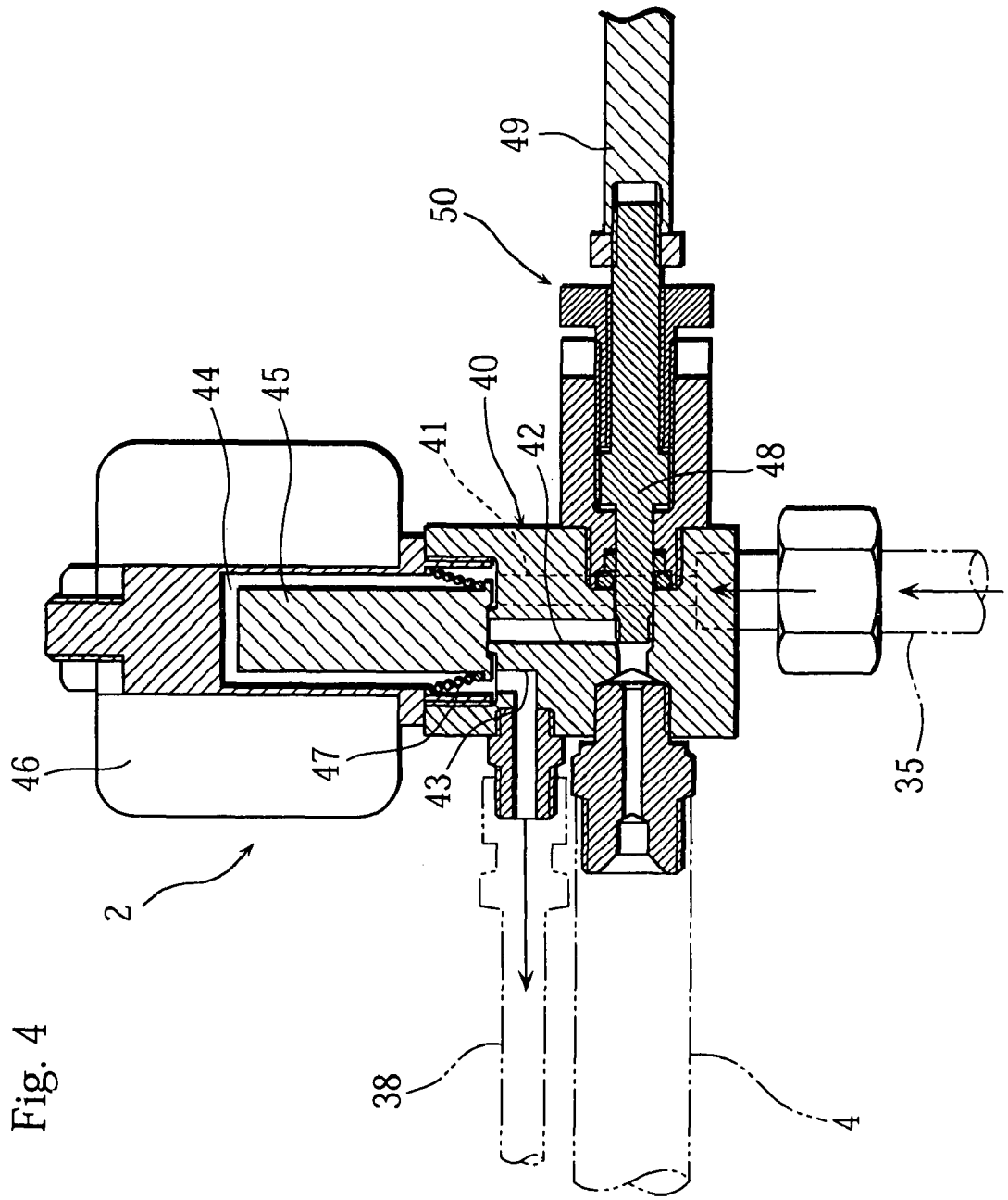
FIG. 4 is a cross-sectional view showing a closed state of an electromagnetic valve.

The electromagnetic valve 2 is, as shown in FIG. 3 and FIG. 4, provided with a main body 40 that a valve main body (plunger) 45 is disposed in an inner space 44, and a coil 46 wound around the main body 40 as to be disposed around the valve main body 45.

The main body 40 of the electromagnetic valve has a steam inflow passage 41, a steam outflow passage 42, and a heating steam circulation passage 43 connected to the inner space 44 and penetrating the main body 40. The steam passage 35 is connected to an outer entrance of the steam inflow passage 41, the connecting tube 4 is connected to an outer exit of the steam outflow passage 42, and a return pipe 38, connected to the steam trap 32, is connected to an outer exit of the heating steam circulation passage 43. The "entrance" means an opening portion on the upstream side of the steam flow, and the "exit" means an opening portion on the downstream side of the steam flow. And, "outer" means outside of the electromagnetic valve 2, and "inner" means the inner space 44 side of the electromagnetic valve 2.

The valve main body 45, always pushed by a compression spring 47 as to lid an inner entrance of the steam outflow passage 42, is composed as to be pulled up against the compression spring 47 by electrifying the coil 46 to open the inner entrance of the steam outflow passage 42. That is to say, the valve main body 45 is freely switched between open and close by switching on and off the electromagnetic valve 2.

Next, to describe the function of the electromagnetic valve 2, the steam from the steam passage 35 (the steam-generating portion 1) flows into the inner space 44 through the steam inflow passage 41, and then, flows into the return pipe 38 through the heating steam circulation passage 43 in the closed state of the electromagnetic valve 2.

On the other hand, in the open state of the electromagnetic valve 2, the steam from the steam passage 35 (the steam-generating portion 1) flows into inner space 44 through the steam inflow passage 41, and then, flows into the connecting tube 4 and the return pipe 38 through the steam outflow passage 42 and the heating steam circulation passage 43.

In other words, in the open state and the closed state of the electromagnetic valve 2, the steam from the steam passage 35 is always flowing into the return pipe 38, and the steam flows into the connecting tube 4 only in the open state of the electromagnetic valve 2.

As described above, the inner portion of the electromagnetic valve 2 can be preliminarily heated by the steam from the steam-generating portion 1 also in the closed state of the electromagnetic valve 2. Therefore, the electromagnetic valve 2 is not cooled even in the closed state to prevent water-drop generation in the electromagnetic valve 2, and only the steam is sent to the connecting tube 4 (the steam-blowing portion 3) in the open state of the electromagnetic valve 2.

Further, the main body 40 of the electromagnetic valve 2 is entirely and certainly heated because the inner entrance of the heating steam circulation passage 43 is disposed near the inner entrance of the steam outflow passage 42.

Although water drops (drain) are generated by warming the main body 40 (or the steam used in the former operation is cooled and turned into water drops) at the beginning of the steam flow in the electromagnetic valve 2 in the closed state of the electromagnetic valve 2, the water drops are sent with steam to the return pipe 38 and not supplied to the steam-blowing portion 3.

Figure 5:
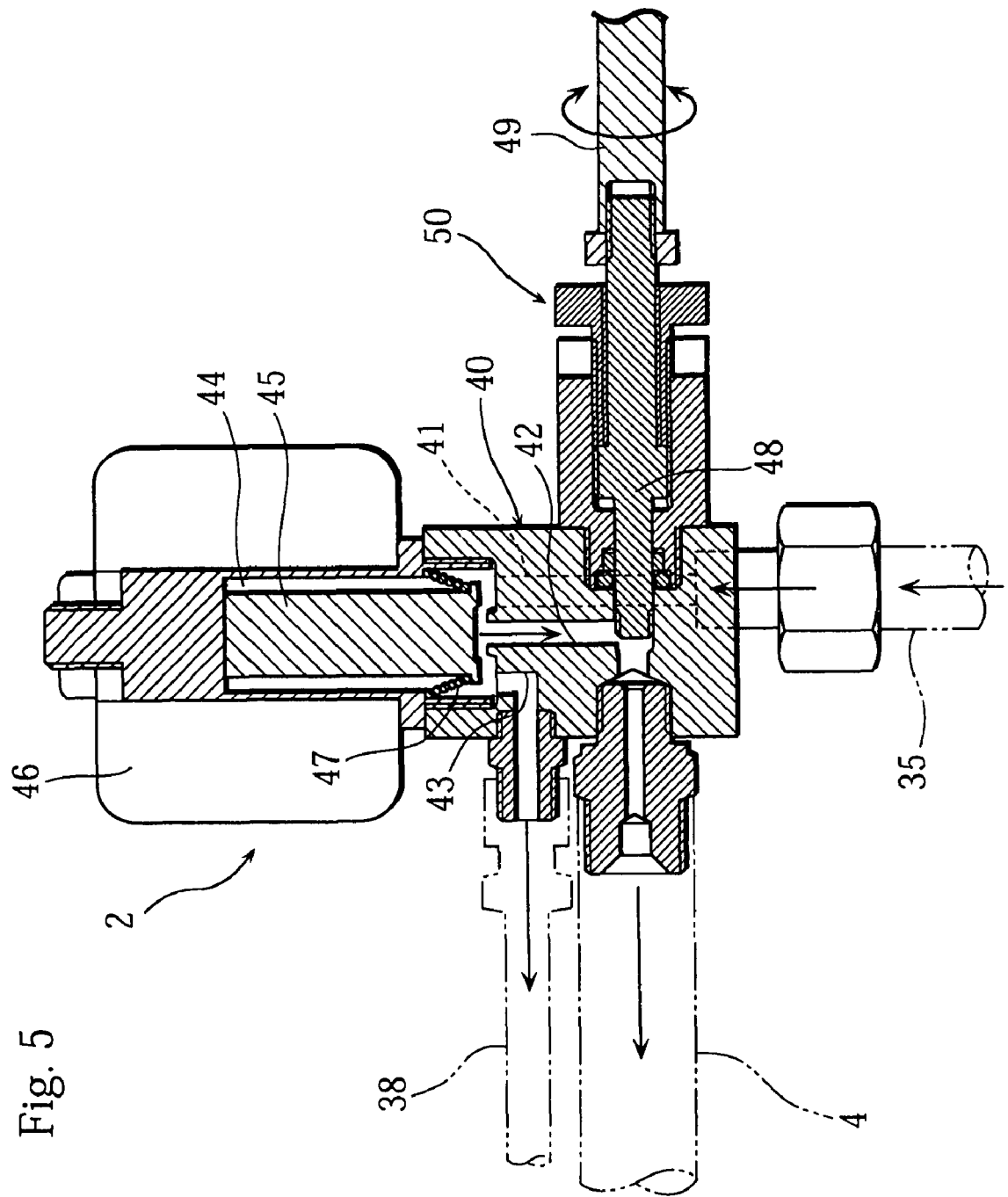
FIG. 5 is a cross-sectional view showing an open state of the electromagnetic valve.

And, the electromagnetic valve 2, as shown in FIGS. 3 through 5, has a steam amount regulation means 50 to regulate (or stop) steam-jetting amount from the steam-blowing portion 3 in the open state of the electromagnetic valve 2. To describe concretely, a regulation spindle 48 is inserted to the main body 40 as to freely screwed in and out with female and male screw connection, and a forth end of the regulation spindle 48 freely proceeds and retreats in the steam inflow passage 42 to shut or flow the steam in the steam inflow passage 42. A base end of the regulation spindle 48 is connected to an end of an operation shaft 49 as to freely moves back and forth only in axis directions, and the regulation spindle 48 is rotated with the operation shaft 49 by rotational operation of a regulation knob 31 fixed to another end of the operation shaft 49 to freely proceed and retreat the forth end of the regulation spindle 48. The regulation knob 31, disposed outside of the casing C, is easily operated from outside.

Figure 6:
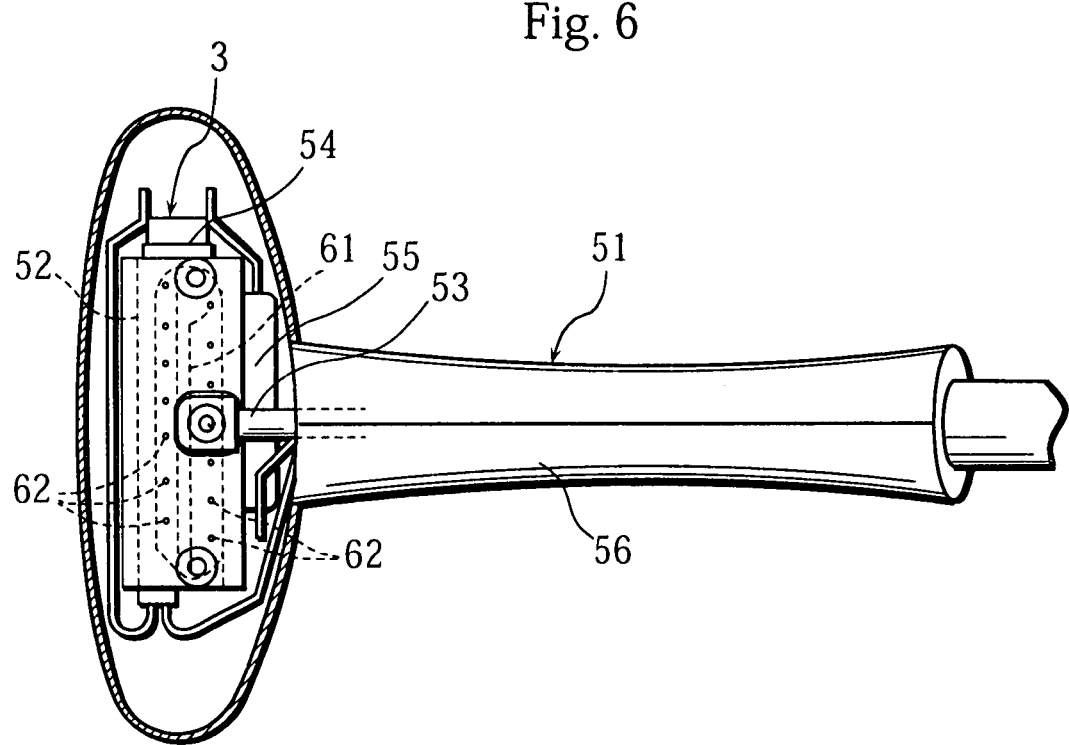
FIG. 6 is a top view with a partial cross section of a steam blower.
Figure 7:
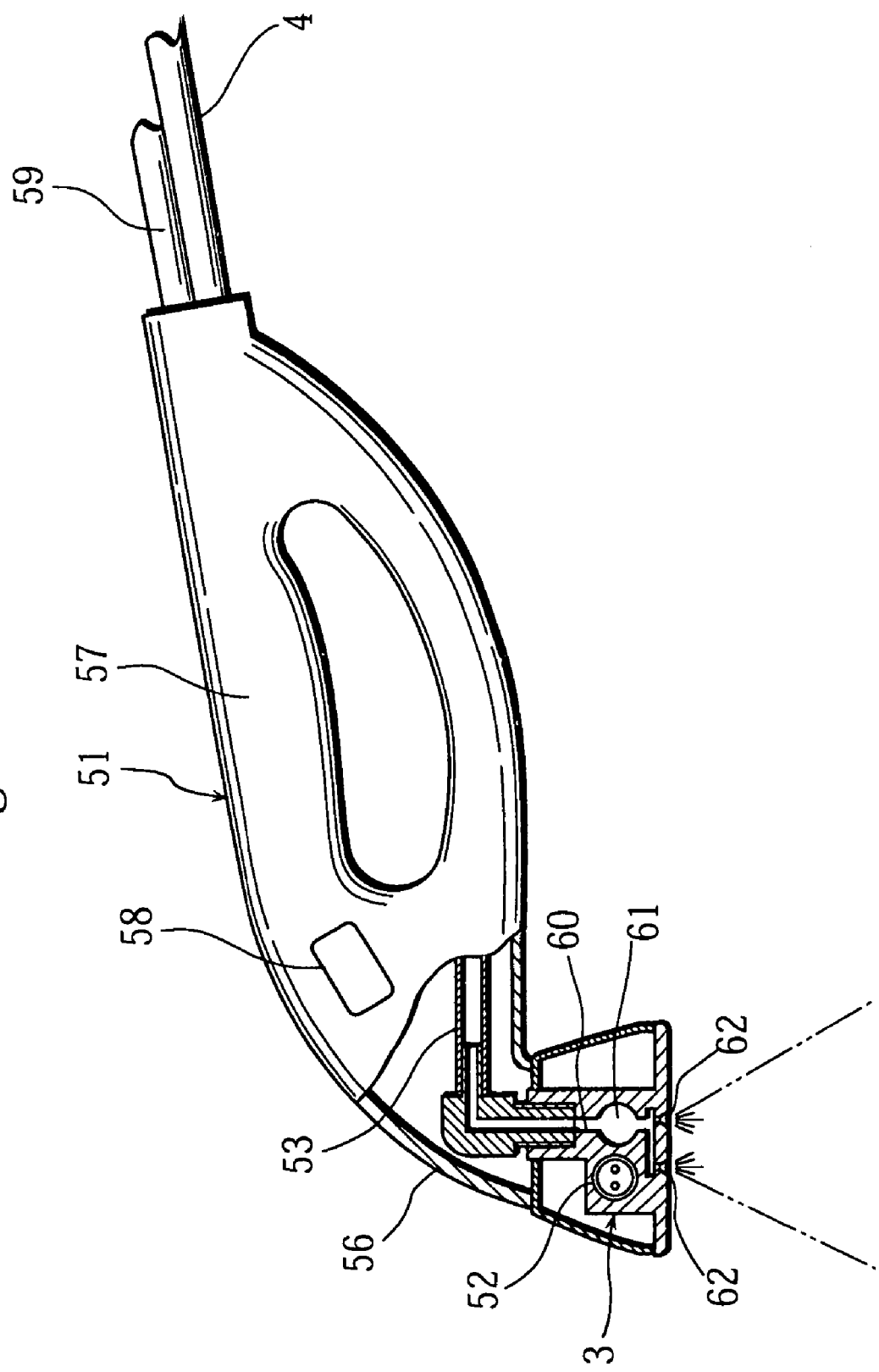
FIG. 7 is a side view with a partial cross section of the steam blower.

The steam blower 51 is, as shown in FIGS. 3, 6, and 7, formed like a brush, provided with the steam-blowing portion 3 as an end portion and a connection pipe 53 which connects the connection tube 4 and the steam-blowing portion 3, and entirely covered by a cover portion 56. A grip portion 57 and an operation switch 58 to switch the open and close of the electromagnetic valve 2 through a cord 59 to operate the steam blower 51 with one hand are formed on the cover portion 56.

The steam-blowing portion 3 is formed as a block, and a steam passage 60 in the blowing portion, of which upstream side is connected to the connection pipe 53, having plural steam jets 62 on the downstream side penetrates the steam-blowing portion 3. And, the steam-blowing portion 3 includes an electric heater 52 to heat the steam passage 60, and has a thermostat 54 and a temperature fuse 55.

To describe concretely, a vaporization space (of cylindrical configuration) 61, occupying most of the steam passage 60, is disposed on the steam passage 60, and the electric heater 52 is disposed near the vaporization space 61.

In short, the steam-blowing portion 3 is composed of excellent material in heat conduction, and the heat of the electric heater 52 spreads over the entire steam passage 60 (especially, the vaporization space 61) through the steam-blowing portion 3.

Next, to describe the function of the steam blower 51, the electromagnetic valve 2 is switched to the open state by the operation switch 58, the steam from the connection tube 4 flows into the steam-blowing portion 3 through the connection pipe 53. The water drops (drain) flowing with the steam is heated by the electric heater 52 in the vaporization space 61 to become the steam again, and only the steam is jetted out of the steam jets 62. Switching on and off of the electric heater 52 is directly connected to the main power source of the apparatus.

That is to say, the connection tube 4, etc. are cooled by the atmosphere in unused state of the apparatus in which the steam is not blown out of the steam blower 51. Although the steam heating the connection tube 4, etc. becomes water drops (or the steam used in the former operation is cooled and turned into water drops) when the electromagnetic valve 2 is opened to use the apparatus in this state, the water drops are not blown out of the steam-blowing portion 3 because the water drops are heated again by the heated steam passage 60 (the vaporization space 61) and become the steam. That is to say, flowing speed of the water drops is slowed in the vaporization space 61 as the water drops are gathered and certainly vaporized.

To sum up the description above, the water drops are not blown out of the steam-blowing portion 3 with the steam in the used state of the apparatus because the apparatuses constructed as the electromagnetic valve 2 is preliminarily heated also in the closed state and the steam passage 60 of the steam-blowing portion 3 is heated. That is to say, without the construction of the present apparatus, in unused state of the apparatus in which the steam is not blown out of the steam blower, the electromagnetic valve main body and the connecting tube are cooled by the atmosphere. When the electromagnetic valve is opened to use the apparatus under the condition above, in an early stage, the steam used in the former operation is already turned into water drops to be blown out of the steam-blowing portion 3, after the early stage, the steam warming the electromagnetic valve and the connecting tube is turned into water drops which are blown with the steam out of the steam-blowing portion, and the water drops of high temperature may directly contact and burn the skin.

Next, as methods of hairdressing and beauty care which use the apparatus, a method of permanent wave in which the pressurized steam is sent to the steam-blowing portion 3 and forced to jet out of the steam-blowing portion 3 to the hair after the hair is smeared with chemicals for permanent wave, a method of hair dye in which the pressurized steam is sent to the steam-blowing portion 3 and forced to jet out of the steam-blowing portion 3 to the hair after the hair is smeared with chemicals for hair dye, a method in which the pressurized steam is sent to the steam-blowing portion 3 and forced to jet out of the steam-blowing portion 3 to the hair after the hair is smeared with treatment agent, a method in which the pressurized steam is sent to the steam-blowing portion 3 and forced to jet out of the steam-blowing portion 3 to the face after the face is smeared with beauty lotion, and a method in which the pressurized steam is sent to the steam-blowing portion 3 and forced to jet out of the steam-blowing portion 3 to parts of a body serially after the skin of the body is smeared with beauty agent (cosmetics, beauty skin lotion, etc.), may be used.

According to the methods described above, the hair or the face is uniformly finished in a short period of time because the steam, blown out of the steam-blowing portion 3 to the hair, the face, etc. (smeared with chemicals), spreads over the entire hair or face rapidly and uniformly. In other words, finishing time is greatly shortened because the steam forced to be blown out of the steam-blowing portion 3 has sufficiently high flowing speed in comparison with conventional vapor (calorie sent to the hair or the face in a unit of time is high). And, finishing time of the entire body is greatly shortened because the steam blown out of the steam-blowing portion 3 to the body has sufficiently high flowing speed in comparison with conventional vapor (calorie sent to the body in a unit of time is high).

The blown-out steam, involving the air with the blowing force and lowering the temperature, becomes of moderate temperature until contact with the hair, the face, or the skin of the body to prevent the the hair, the face, and the body from being burnt. Naturally, the steam certainly contacts the hair, the face, or the skin of the body distant from the steam-blowing portion 3.

In the methods above, the finishing time of hairdressing and beauty care is greatly shortened further to reduce the damage on the hair or the skin by setting the pressure of the steam (indicated on the gauge) just before the jetting from the steam-blowing portion 3 to be 0.2 to 0.5 MPa to make the steam temperature just before the jetting 120 to 150° C., and setting wind pressure of the steam just before the contact with the hair or the skin to be 5 to 15 Pa to make steam temperature just before the contact with the hair or the skin 40 to 45° C.

The present invention, not restricted to the embodiments above, is modified within the range of the scope of the invention. For example, plural electromagnetic valves 2 and steam-blowing portions 3 may be disposed in one steam-generating portion 1.

According to the steam-supplying apparatus for hairdressing and beauty care, the steam can hit with force the hair, the face, or the skin of the body smeared with chemicals, the steam can spread over the hair, the face, or the body uniformly in a short period of time, finishing time of the hairdressing and beauty care is greatly shortened, and damage against the hair, the face, or the skin of the body by chemicals and high-temperature steam is reduced as much as possible. And, the electromagnetic valve 2 is always warmed and the steam-blowing portion 3 is heated to restrict blowing of the high-temperature water drops with the steam jetting out of the steam-blowing portion 3 for burning prevention when the apparatus is used.

And, the water drops are certainly vaporized in the vaporization space 61 to restrict further the jetting of the water drops from the steam-blowing portion 3.

Further, stable amount of steam is blown out of the steam-blowing portion 3, steam amount of an early stage and steam amount of a later stage are made uniform in continuous steam blowing, and finishing time of hairdressing and beauty care is shortened and uniform finish is possible with good usability.

While preferred embodiments of the present invention have been described in this specification, it is to be understood that the invention is illustrative and not restrictive, because various changes are possible within the spirit and indispensable features.

What is claimed is:

1. A steam-supplying apparatus, comprising:
    a steam-generating portion generating steam;
    an electromagnetic valve receiving the steam from the steam-generating portion, the electromagnetic valve having a valve main body and forming a heating steam circulation passage inside the electromagnetic valve to heat the inside of the electromagnetic valve with the steam from the steam-generating portion when the electromagnetic valve is in a closed state;
    a tube receiving the steam from the electromagnetic valve when the electromagnetic valve is in an open state, the tube being flexible;
    a return pipe receiving steam from the electromagnetic valve when the electromagnetic valve is in both the closed and open state, the return pipe being distinguishable from the tube;
    a steam-blowing portion receiving the steam from the tube; and
    an electric heater being disposed in the steam-blowing portion to heat a vaporization space of a steam passage in the steam-blowing portion, the electric heater changing water drops to steam in the vaporization space, the steam-blowing portion outputting steam and not water drops,
    wherein, when the electromagnetic valve is in the closed state, steam circulates from the steam-generating portion through the heating steam circulation passage and around the valve main body and to the return pipe.

2. The steam-supplying apparatus of claim 1, further comprising a return pipe in communication with the heating steam circulation passage, with some of the steam from the steam-generating portion passing through the heating steam circulation passage and the return pipe when the electromagnetic valve is in the closed state and when the electromagnetic valve is in an open state.

* * * * *